(12) United States Patent
Layton et al.

(10) Patent No.: US 7,564,449 B2
(45) Date of Patent: Jul. 21, 2009

(54) METHOD OF SCROLLING THAT IS ACTIVATED BY TOUCHDOWN IN A PREDEFINED LOCATION ON A TOUCHPAD THAT RECOGNIZES GESTURES FOR CONTROLLING SCROLLING FUNCTIONS

(75) Inventors: Michael D. Layton, Salt Lake City, UT (US); Don T. Saxby, Tooele, UT (US); Richard D. Woolley, Orem, UT (US)

(73) Assignee: Cirque Corporation, Salt Lake City, UT (US)

( * ) Notice: Subject to any disclaimer, the term of this patent is extended or adjusted under 35 U.S.C. 154(b) by 0 days.

(21) Appl. No.: 11/764,645

(22) Filed: Jun. 18, 2007

(65) Prior Publication Data

US 2007/0291014 A1 Dec. 20, 2007

Related U.S. Application Data

(60) Provisional application No. 60/805,021, filed on Jun. 16, 2006.

(51) Int. Cl.
*G06F 3/041* (2006.01)
(52) U.S. Cl. ........................................ 345/173; 345/684
(58) Field of Classification Search ................ 345/156, 345/157, 173–179, 684
See application file for complete search history.

(56) References Cited

U.S. PATENT DOCUMENTS

| 6,639,586 | B2 * | 10/2003 | Gerpheide | 345/173 |
| 2003/0076306 | A1 | 4/2003 | Zadesky et al. | |
| 2003/0210286 | A1 | 11/2003 | Gerpheide et al. | |
| 2004/0252109 | A1 * | 12/2004 | Trent et al. | 345/174 |
| 2005/0168489 | A1 | 8/2005 | Ausbeck, Jr. | |
| 2006/0227065 | A1 * | 10/2006 | Yukawa et al. | 345/7 |
| 2007/0013674 | A1 * | 1/2007 | Woolley | 345/173 |
| 2007/0229472 | A1 * | 10/2007 | Bytheway | 345/173 |
| 2007/0236475 | A1 * | 10/2007 | Wherry | 345/173 |
| 2008/0048978 | A1 * | 2/2008 | Trent et al. | 345/157 |
| 2008/0174567 | A1 * | 7/2008 | Woolley et al. | 345/173 |

FOREIGN PATENT DOCUMENTS

GB 2433402 A * 6/2007

* cited by examiner

*Primary Examiner*—Ricardo L Osorio
(74) *Attorney, Agent, or Firm*—Morriss O'Bryant Compagni (57) ABSTRACT

A method of using a capacitance-sensitive touchpad, wherein the touchpad includes a zone on a surface thereof, wherein touchdown of a pointing object within the zone enables activation of a scrolling function, wherein direction of scrolling is then controlled by a gesture by the pointing object, such as moving in a circular motion in a clockwise direction to move down in a list, and in a counter clockwise direction to move up in a list, and wherein fast and slow scrolling speeds are controlled by tapping functions within the scroll zone.

17 Claims, 6 Drawing Sheets

METHOD OF SCROLLING THAT IS ACTIVATED BY TOUCHDOWN IN A PREDEFINED LOCATION ON A TOUCHPAD THAT RECOGNIZES GESTURES FOR CONTROLLING SCROLLING FUNCTIONS

CROSS REFERENCE TO RELATED APPLICATIONS

This document claims priority to and incorporates by reference all of the subject matter included in the provisional patent application, having Ser. No. 60/805,021 and filed on Jun. 16, 2006.

BACKGROUND OF THE INVENTION

1. Field of the Invention

This invention relates generally to methods of scrolling on a touchpad. Specifically, the invention relates to a method of activating a scrolling function by performing touchdown in a pre-defined location, and then controlling various scrolling functions by using gestures to control the direction of scrolling.

2. Description of Related Art

As portable electronic appliances become more ubiquitous, the need to efficiently control them is becoming increasingly important. The wide array of electronic devices that can benefit from a means of controlling scrolling include, but should not be considered limited to, MP3 players, portable video players, digital cameras and camcorders, mobile telephones, and other portable devices. However, even desktop devices such as desktop computers can take advantage of a method of scrolling that is quick and efficient.

One of the main problems that many portable electronic appliances have is that their very size limits the number of ways in which communicating with the appliances is possible. There is typically a very limited amount of space that is available for an interface when portability is so important. For example, mobile telephones that require a telephone number keypad are now replacing many personal digital assistants (PDAs). Typically, PDAs require a keyboard for data entry. The inventors of the present invention were involved in the discovery and development of a touchpad that is disposed underneath a telephone keypad. Hiding the keypad under the telephone keymat made the best possible use of the limited space available for data entry.

Other developers and users of portable electronic appliances have seen the benefits that come from using a circular touchpad. The very nature of a circular touchpad enables continuous circular motion in a same direction. However, a circular touchpad typically provides less functionality for other touchpad functions, such as cursor manipulation. Thus, it would be an advantage to provide improved scrolling functions on a typical rectangular or even a square touchpad shape.

Consider a personal digital assistant (PDA). A PDA often has to provide a full keyboard in order to enter characters from an alphabet. Even more difficult is the problem of having to deal with graphical interfaces. PDAs and even mobile telephones are becoming small but portable computers with all of the information that might be carried in a larger computing device. Furthermore, graphical interfaces present some unique challenges when providing a user interface.

The difficulties described are not unique to PDAs and mobile telephones. Even less complex devices are being pressed to provide more and more functionality. Consider an MP3 audio player that enables a user to list items such as songs, and then move through that list in order to select a song to play, or to move to a playlist.

One feature of these portable electronic appliances that is common to all of those listed above and other appliances not mentioned or which are under development, is the need to quickly and easily move or scroll through lists and make selections. It should be noted that all of the portable electronic appliances listed above have or will soon have touchpads disposed somewhere on or within the appliances. This evolution is only natural considering the complex functions and graphical interfaces that they use. However, these portable electronic appliances presently lack a means for providing better control when scrolling through lists.

Thus, it would be an improvement over the prior art to provide a system and method for providing rapid access to scrolling through a list.

When considering how to provide a scrolling feature, it should be realized that an important issue to consider is the size or range of the list that will be used. For example, it may be desirable to control a portable electronic appliance where the lists are very large, and it may be advantageous to move fast and slow while using the same device. For example, the number of songs that can be stored on many MP3 players is now into the thousands. Being able to rapidly move to a song location may require a lot of time, depending upon the interface that is provided for scrolling.

A good analogy to this situation is tuning a radio that has a wide dynamic range. A radio typically has a simple hand-operated control. Tuning a radio to frequency 95.1 MHz over an entire range of 85-105 MHz is to control 1 part in 200. Using a single-turn "knob" or potentiometer, a single turn or revolution of the knob changes the frequency setting from a minimum of 85 MHz to maximum of 105 MHz. Thus, it becomes obvious why it is very hard to get the "fine" control that is necessary to dial into 0.1 MHz resolution. Fine and coarse control can also be thought of as slow and fast incrementing or decreasing of values.

Prior art solutions for this problem have included a multi-turn potentiometer or knob. In this scenario, the knob can be turned multiple revolutions where one revolution might be equal to 2 MHz. In this way, it becomes much easier to dial in 0.1 MHz resolution (i.e., 0.1/2.0=>$\frac{1}{20}$th revolution). But now a new problem has arisen. In order to move over the entire frequency range of 20 MHz will now require ten complete turns of the knob, which now becomes an annoyingly slow procedure. Interestingly, most radios and many industrial controls rely on this "many-turns-of-the-knob" solution.

Another prior art solution is to provide two knobs. One knob is for coarse control, and the other knob is for fine control. This solution is apparently common for industrial or laboratory equipment, but it is rare for consumer devices. This disparity is a good example of the fact that it is not user friendly or impossible because of space constraints to provide more controls.

Thus, the problem becomes one of being able to provide the ability to move quickly over the entire dynamic range in a single turn, while at the same time being able to easily change an operating mode from a coarse tuning mode to a fine tuning mode and thus dial-in quickly to a fine resolution.

Accordingly, what is needed is a system and method for providing user input using a touchpad where the manner in which a pointing object touches the touchpad enables fine or coarse input, without having to resort to other mechanisms for changing the resolution of input.

The present invention solves more than just the problem of scrolling through lists. The present invention can be applied to controls that are used in any type of system that can receive input from an electronic or mechanical knob. If a system can be coupled to a touchpad, the touchpad can provide coarse or fine input that is presently provided through multiple knobs, or poorly with just a single knob. Thus, what is needed is a system and method for providing touchpad input to any system that utilizes knobs, sliding actuators or other non-touchpad means to provide analog input. What is also needed is a system and method for providing electronic devices with input that can be analogized to the turning of knobs or other similar actuators.

It should be noted that one method of scrolling is through the use of a dedicated or non-dedicated scroll zone on a vertical or horizontal edge of a touchpad. The user slides a finger up or down along the scroll zone. However, when a user reaches an edge of a scrolling zone, the user is required to lift a finger and move it back in order to keep scrolling in a same direction. This is a disadvantage of a linear scrolling region, regardless of whether or not the scrolling region is dedicated to scrolling or not.

Figure 1:
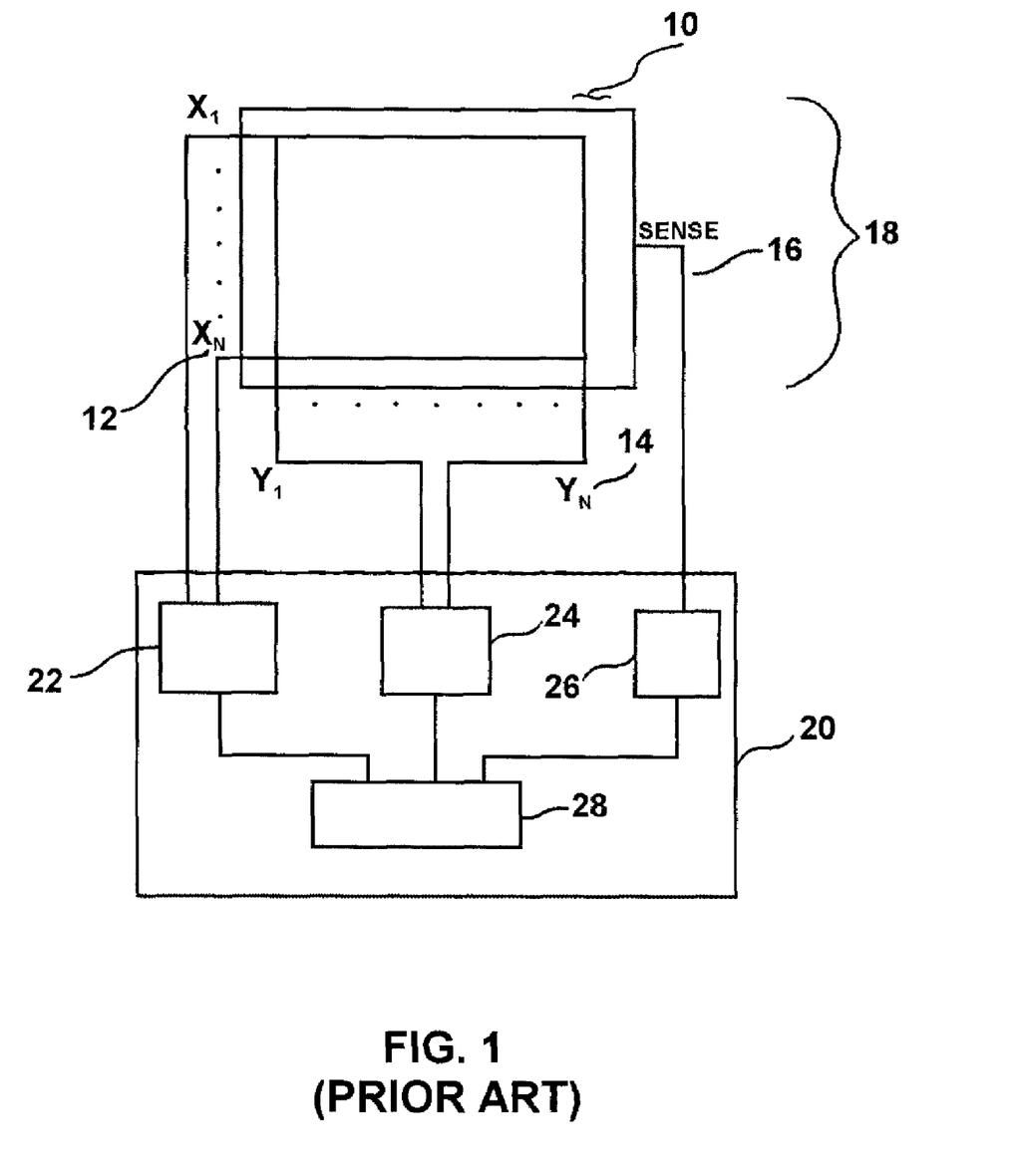
FIG. 1 is a perspective diagram of the components of a capacitance-sensitive touchpad as made by CIRQUE® Corporation and which can be used to implement the present invention.

Before describing the invention in more detail it is useful to describe the capacitance-sensitive touchpad technology of CIRQUE® Corporation. The CIRQUE™ Corporation touchpad is a mutual capacitance-sensing device and an example is illustrated in FIG. 1. In this touchpad, a grid of row and column electrodes is used to define the touch-sensitive area of the touchpad. Typically, the touchpad is a rectangular grid of approximately 16 by 12 electrodes, or 8 by 6 electrodes when there are space constraints. Interlaced with these row and column electrodes is a single sense electrode. All position measurements are made through the sense electrode.

In more detail, FIG. 1 shows a capacitance sensitive touchpad 10 as taught by Cirque® Corporation includes a grid of row (12) and column (14) (or X and Y) electrodes in a touchpad electrode grid. All measurements of touchpad parameters are taken from a single sense electrode 16 also disposed on the touchpad electrode grid, and not from the X or Y electrodes 12, 14. No fixed reference point is used for measurements. Touchpad sensor control circuitry 20 generates signals from P,N generators 22, 24 that are sent directly to the X and Y electrodes 12, 14 in various patterns. Accordingly, there is a one-to-one correspondence between the number of electrodes on the touchpad electrode grid, and the number of drive pins on the touchpad sensor control circuitry 20.

The touchpad 10 does not depend upon an absolute capacitive measurement to determine the location of a finger (or other capacitive object) on the touchpad surface. The touchpad 10 measures an imbalance in electrical charge to the sense line 16. When no pointing object is on the touchpad 10, the touchpad sensor control circuitry 20 is in a balanced state, and there is no signal on the sense line 16. There may or may not be a capacitive charge on the electrodes 12, 14. In the methodology of CIRQUE® Corporation, that is irrelevant. When a pointing device creates imbalance because of capacitive coupling, a change in capacitance occurs on the plurality of electrodes 12, 14 that comprise the touchpad electrode grid. What is measured is the change in capacitance, and not the absolute capacitance value on the electrodes 12, 14. The touchpad 10 determines the change in capacitance by measuring the amount of charge that must be injected onto the sense line 16 to reestablish or regain balance on the sense line.

The touchpad 10 must make two complete measurement cycles for the X electrodes 12 and for the Y electrodes 14 (four complete measurements) in order to determine the position of a pointing object such as a finger. The steps are as follows for both the X 12 and the Y 14 electrodes:

First, a group of electrodes (say a select group of the X electrodes 12) are driven with a first signal from P, N generator 22 and a first measurement using mutual capacitance measurement device 26 is taken to determine the location of the largest signal. However, it is not possible from this one measurement to know whether the finger is on one side or the other of the closest electrode to the largest signal.

Next, shifting by one electrode to one side of the closest electrode, the group of electrodes is again driven with a signal. In other words, the electrode immediately to the one side of the group is added, while the electrode on the opposite side of the original group is no longer driven.

Third, the new group of electrodes is driven and a second measurement is taken.

Finally, using an equation that compares the magnitude of the two signals measured, the location of the finger is determined.

Accordingly, the touchpad 10 measures a change in capacitance in order to determine the location of a finger. All of this hardware and the methodology described above assume that the touchpad sensor control circuitry 20 is directly driving the electrodes 12, 14 of the touchpad 10. Thus, for a typical 12×16 electrode grid touchpad, there are a total of 28 pins (12+16=28) available from the touchpad sensor control circuitry 20 that are used to drive the electrodes 12, 14 of the electrode grid.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes on the same rows and columns, and other factors that are not material to the present invention.

Although the CIRQUE® touchpad described above uses a grid of X and Y electrodes and a separate and single sense electrode, the sense electrode can also be the X or Y electrodes by using multiplexing. Either design will enable the present invention to function.

The underlying technology for the CIRQUE® Corporation touchpad is based on capacitive sensors. However, other touchpad technologies can also be used for the present invention. These other proximity-sensitive and touch-sensitive touchpad technologies include electromagnetic, inductive, pressure sensing, electrostatic, ultrasonic, optical, resistive membrane, semi-conductive membrane or other finger or stylus-responsive technology.

BRIEF SUMMARY OF THE INVENTION

In a preferred embodiment, the present invention is a method of using a capacitance-sensitive touchpad, wherein the touchpad includes a zone on a surface thereof, wherein touchdown of a pointing object within the zone enables activation of a scrolling function, wherein the direction of scrolling is then controlled by a gesture by the pointing object, such as moving in a circular motion in a clockwise direction to move "down" in a list, and moving in a counter clockwise direction to move "up" in a list, and wherein determining if scrolling will be fast or slow is controlled by tapping functions within the scroll zone.

In another aspect of the invention, the size of the radius of the circular motion determines the speed of scrolling.

In another aspect of the invention, no dedicated scroll zone is provided. Activation of scrolling is accomplished by the detection of two or more pointing objects on the touchpad surface.

In another aspect of the invention, two scroll zones are provided, one dedicated to a fast scrolling speed, and the other dedicated to a slow scrolling speed.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 2:
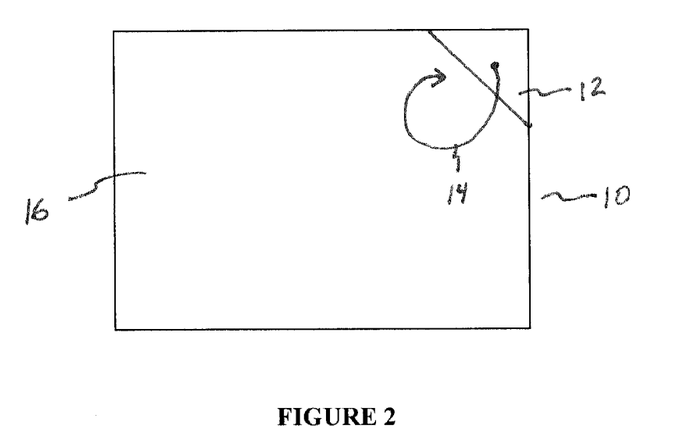
FIG. 2 is a top view of a touchpad having a dedicated scrolling activation zone as made in accordance with the principles of a first embodiment of the invention.

The touchpad in which this scrolling function is implemented is a product of CIRQUE® Corporation. FIG. 2 shows a first embodiment of the present invention wherein a single and dedicated scrolling activation zone 12 is provided on a touchpad surface 10. The user makes touchdown in the scrolling activation zone 12 to activate the scrolling function, and maintains contact with the touchpad 10. The user then moves the finger in a clockwise direction as shown by line 14 to enable scrolling in a first direction, and moves the finger in a counterclockwise direction to enable scrolling in a direction that is opposite to the first direction. The actual direction of scrolling can be assigned as desired. The direction of scrolling can be changed on the fly, so that even though a first direction of scrolling is performed initially, the direction of scrolling in the opposite direction is performed by stopping the finger and simply moving in a circular motion in the opposite direction.

An important aspect of the invention is that the movement of the finger (or other pointing object such as a stylus) that causes scrolling is independent of the scrolling activation region 12 once scrolling has been activated. In other words, the finger does not have to stay within the scrolling activation region 12 in order to continue to perform scrolling. Thus, the finger may stay within the scrolling activation region 12, move outside the scrolling activation region and stay outside, or cross the boundary between the scrolling activation region and a non-activating region 16 repeatedly.

Once the scrolling function is activated, the finger is free to move anywhere on the touchpad surface and cause scrolling of a list or increasing or decreasing of some value of some parameter. Once scrolling is activated, it does not matter where the finger travels on the touchpad surface to cause scrolling. Termination of the scrolling function is performed by simply lifting the finger off of the touchpad.

FIG. 2 is provided to illustrate the concept that once a finger has made touchdown in the scrolling activation region 12, movement can be performed in an initial direction, and then reversed to perform scrolling in an opposite direction as shown by line 18. It is noted that changing direction of movement does not have to occur within the scrolling activation region 12.

Figure 3:
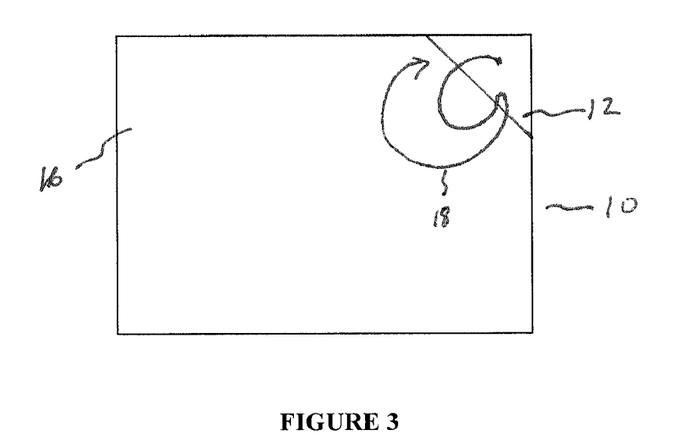
FIG. 3 is a top view of a touchpad having a dedicated scrolling activation zone and showing different movements of a finger to cause scrolling in opposite directions.
Figure 4:
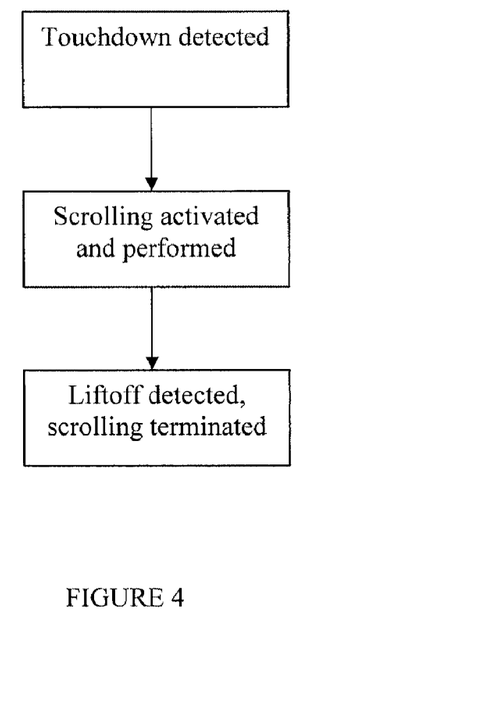
FIG. 4 is a flowchart of operations in a first method of operation of the present invention.

It is envisioned in an alternative embodiment that other functions may also be actuated by touchdown in a scrolling zone on the touchpad. In a first embodiment, the process is as described in FIG. 3, where touchdown is detected, then scrolling is activated and performed, and finally liftoff is detected and the scrolling function is terminated. This process assumes that before touchdown is detected, a list that can be scrolled through is already the active window or otherwise designated.

Figure 5:
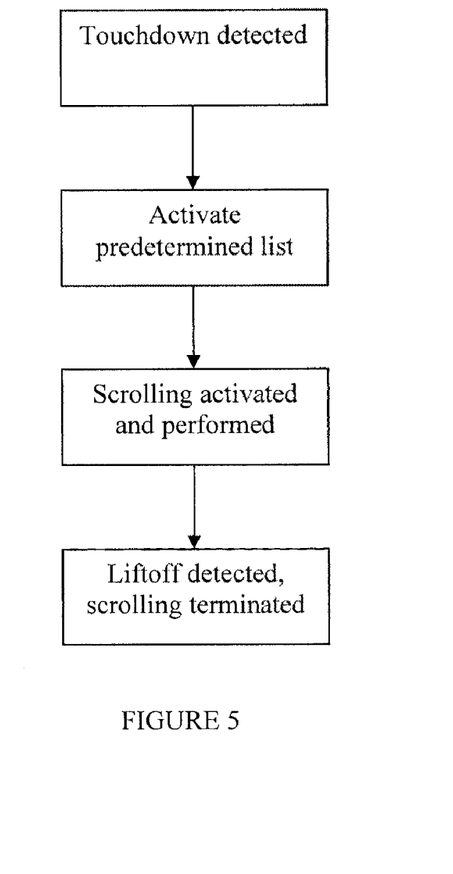
FIG. 5 is a flowchart of operations in an alternative method of operation of the present invention.

In an alternative embodiment as shown in FIG. 5, the act of touchdown not only activates the scrolling function, but also activates the particular list that will be scrolled through. Thus the process is touchdown is detected, a predetermined list is activated, then scrolling is activated and performed in that predetermined list, and finally liftoff is detected and the scrolling function is terminated.

For example, touchdown in a first zone may enable scrolling through a list of artists on an MP3 player. Touchdown in a second zone may also enable scrolling, but through a different list such as a list of songs stored on the MP3 player. Touchdown in a third zone may activate a list of playlists that were previously generated. Thus, the ability to scroll through the lists is activated by the mere act of touchdown in specific zones on the touchpad.

Figure 6:
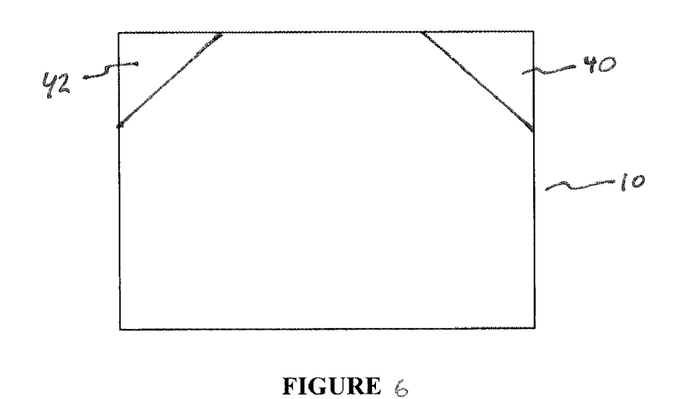
FIG. 6 is a top view of a touchpad having a dedicated fast scrolling zone and a dedicated slow scrolling zone.

In an alternative embodiment as shown in FIG. 6, a first scrolling zone 40 is dedicated to fast scrolling. Fast scrolling can be defined as movements on the touchpad corresponding to quickly incrementing through each item in a list. Alternatively, fast scrolling can correspond to incrementing through more than one item or value on the list at a time. For instance, each time the list is incremented, five items on the list are skipped at a time. The number of items that the list is incremented was arbitrarily selected to be five. Any number can be selected as the number of items that are skipped.

Along with the dedicated fast scrolling zone 40, another zone 42 is dedicated to slow scrolling. Slow scrolling can be defined as a longer range of motion of a finger across a touchpad 10 in order to enable a list to be incremented or decremented by a single item or value.

With both of these dedicated scrolling zones 40, 42, the direction of scrolling is again controlled by the direction of circular motion that the finger makes on the touchpad 10.

In an alternative embodiment, touchdown in a touch zone defines the speed of scrolling and the specific list in which scrolling will occur, thus combining the concepts of dedicating a scroll activation zone to speed and which list will be scrolled.

In another alternative embodiment, in a single scrolling zone, both fast and slow scrolling can be performed. For example, fast scrolling is activated by a single tap within scrolling activation zone 12 and then touchdown within the scrolling activation zone and then movement in a circular motion to enable scrolling. Slow scrolling is activated by a double tap, and then touchdown within the scrolling activation zone 12 and then movement. The assignment of a single tap to activate fast scrolling and a double tap to activate slow scrolling can be switched as desired.

Figure 7:
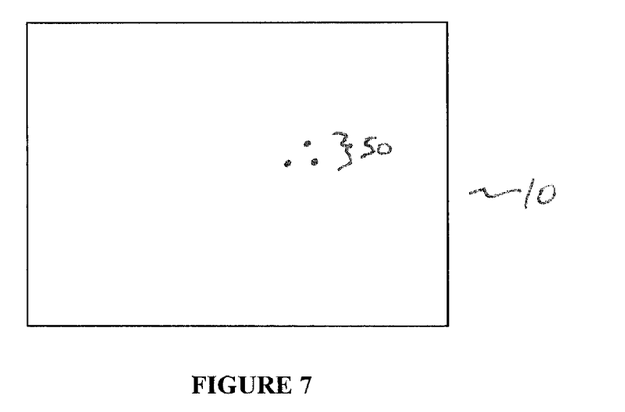
FIG. 7 is a top view of a touchpad showing that multiple taps are being performed on a general purpose touchpad to activate the scrolling function.

Alternatively, multiple taps (a multiple-tap operation) may be used to activate scrolling instead of touchdown in a scrolling activation zone. Thus, scrolling activation commands performed by tapping would be done anywhere on the surface of a general purpose touchpad instead of beginning in a dedicated scrolling activation zone 12. For example, as shown in FIG. 7, triple tapping as indicated by dots 50 anywhere on the touchpad 10 could be used to avoid confusion with single and double tapping operations that are common on a touchpad. It should be understood that scrolling activation outside of a dedicated scrolling zone can be performed by any desired number of taps.

Figure 8:
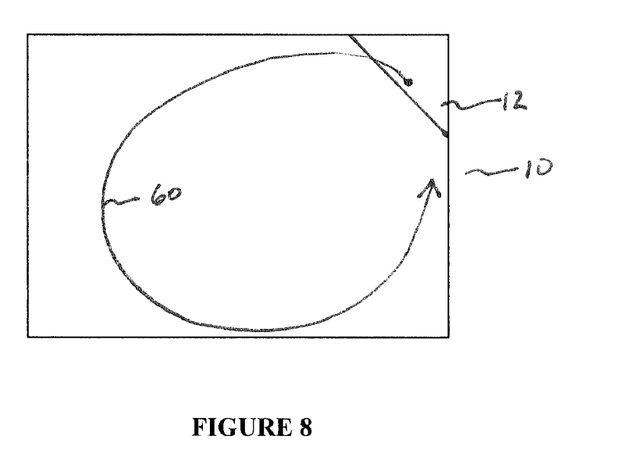
FIG. 8 is a top view of a touchpad showing a movement of a finger circumscribing a circle with a large diameter to cause either coarse or fine scrolling to occur.
Figure 9:
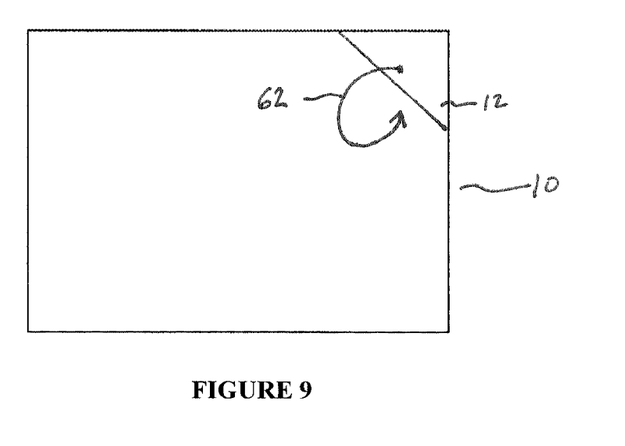
FIG. 9 is a top view of a touchpad showing a movement of a finger circumscribing a circle with a small diameter to cause either coarse or fine scrolling to occur.

In an alternative embodiment, fast and slow scrolling are controlled by the type of gesture being performed. For example, as shown in FIG. 8, scrolling takes place in scrolling activation zone 12, and then fast scrolling is performed when the finger makes a circular motion having a large radius as shown by line 60, and slow scrolling is performed when the finger makes a circular motion having a small radius as shown by line 62 in FIG. 9.

Figure 10:
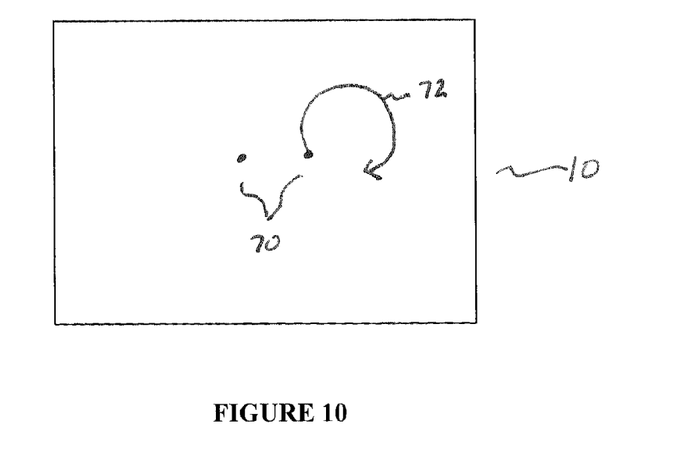
FIG. 10 is a top view of a touchpad showing two fingers making contact with the touchpad to activate scrolling.

In another alternative embodiment, no dedicated scrolling zone is used. Instead, multiple finger detection activates scrolling. For example, as shown in FIG. 10, two fingers can be simultaneously placed anywhere on the touchpad to activate scrolling as indicated by dots 70, then one finger can be raised and the other moved in the circular motion as indicated by line 72 to control scrolling.

Figure 11:
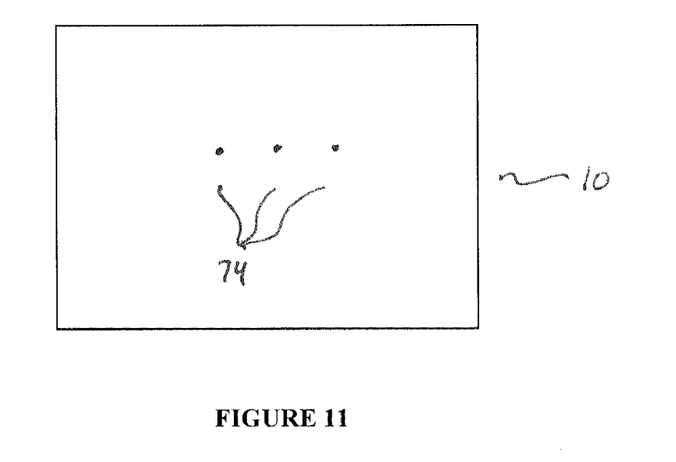
FIG. 11 is a top view of a touchpad showing three fingers making contact with the touchpad to activate scrolling.

FIG. 11 shows that alternatively, more than two fingers can be placed on the touchpad surface 10 to enable scrolling as indicated by dots 74. In any embodiment where more than one finger is being used, it is another aspect of the invention that the fingers can be spaced apart a specific minimum distance or be disposed right next to each other. The multiple fingers can remain on the touchpad surface and be moved together to cause scrolling, or only one finger must remain on the touchpad surface and be moved to cause scrolling.

Figure 12:
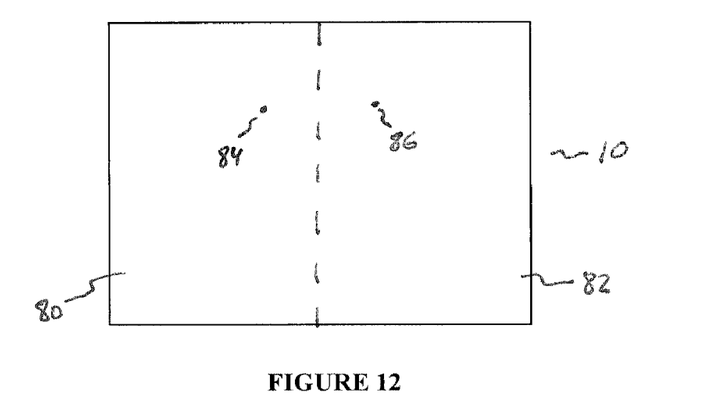
FIG. 12 is a top view of a touchpad that is divided into two sides, wherein touchdown in both halves activates scrolling.

It may be necessary to restrict the locations that the two fingers must be detected in order to enable scrolling. For example, as shown in FIG. 12, the touchpad 10 might be divided into two equal halves 80, 82, and one finger must be detected in each half as indicated by dots 84 and 86.

Figure 13:
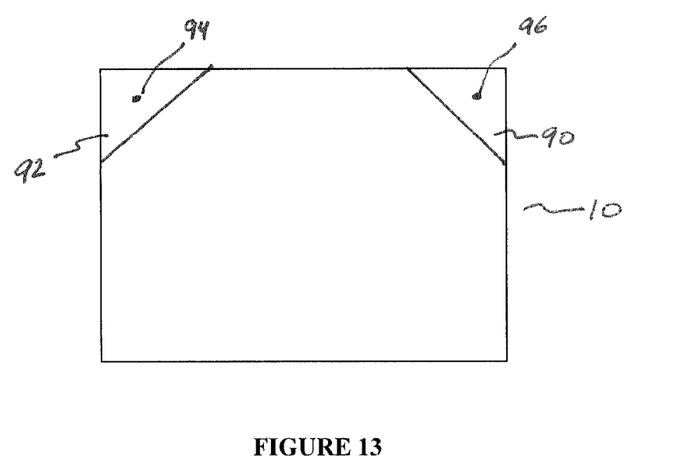
FIG. 13 is a top view of a touchpad having two scrolling activation zones, wherein touchdown must occur in both zones to activate scrolling.

Alternatively as shown in FIG. 13, the fingers might have to be detected in two particular corners 90, 92 of the touchpad as indicated by dots 94 and 96 in order to activate scrolling.

It should also be stated that scrolling through lists is only one example of the types of functions that can be actuated through touchdown on the touchpad. It is envisioned that other functions can also be activated. Some examples of functions that can be actuated will include, but should not be considered to be limited to, adjustments to volume, adjusting settings on an equalizer, adjusting brightness, adjusting contrast, adjusting speed forward or backward, skipping forwards and backwards among various items, zooming in or out, moving a view or a web page up or down, channel selection up or down, screen up or down, advancing forwards or backwards through items that may be selected such as tools or weapons in a game, etc. The common feature is that a scrolling-type of function can be applied to any type of function wherein incremental movements are necessary to make adjustments to a particular setting of the function that is being controlled.

It is another aspect of the present invention that the functions that can be actuated may also be dynamically allocated to the surface of the touchpad 10. For example, consider a see-through touchpad implemented with nearly transparent electrodes as known to those skilled in the art. The touchpad is disposed over or under a display screen such as a liquid crystal display (LCD). The display screen can be any size, and the touchpad can be manufactured to the same dimensions. It is envisioned that the display screen can be programmed to display a label for the functions that can be actuated by touchdown on dynamically assigned buttons.

Figure 14:
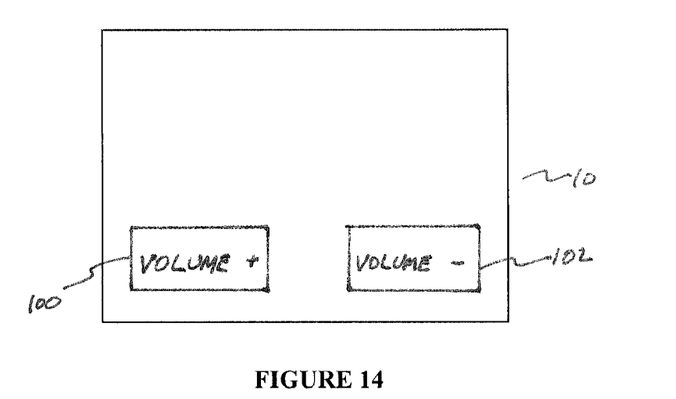
FIG. 14 is a top view of a touchpad that is disposed over an LCD display, wherein the display is showing the feature that can be activated if a finger makes touchdown within the boundaries of a button being displayed.
Figure 15:
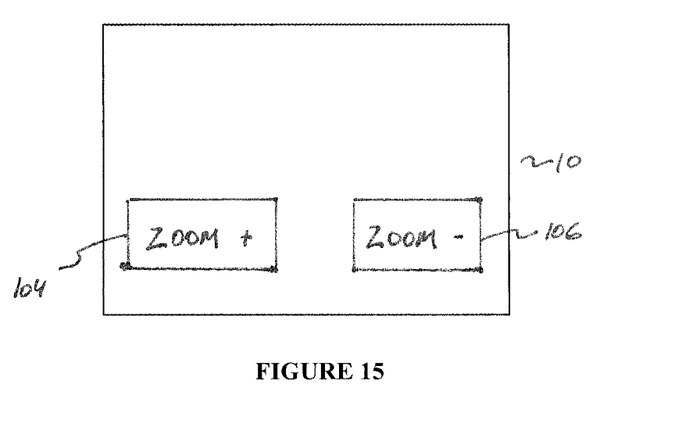
FIG. 15 is a top view of a touchpad from FIG. 14 wherein the LCD is now displaying a different feature that can be activated by touchdown within the same boundaries of the button of the previous function.

As shown in FIG. 14, locations 100, 102 on the touchpad may activate a volume control in a first mode. The user may then be able to change to a second mode of operation as illustrated in FIG. 15. In the second mode of operation, the same locations 100, 102 where the volume buttons were displayed are no longer functioning as "VOLUME" buttons, but are now functioning as "ZOOM" buttons 104, 106. The display may label the function of the buttons in order to provide more guidance to the user. In this second mode, touchdown on the ZOOM buttons 104, 106 will cause a ZOOM function to be performed when the finger is then moved in a circular motion, and not the VOLUME functions. It is noted that a single VOLUME and ZOOM button could be used, where scrolling in one direction causes an increase in value, and scrolling in the opposite direction causes a decrease in the value.

Thus, the circuitry of the touchpad 10 will enable volume to be adjusted when touchdown occurs on the VOLUME buttons 100, 102, in the first mode, but changes to enable the ZOOM to be adjusted when the device is operating in a second mode, and the VOLUME buttons 100, 102 are changed to display the ZOOM buttons 104, 106 in the same location. Alternatively, no button is being displayed, but the function is known to the user.

It is noted that the features of the present invention for controlling operation of the scrolling functions may be implemented in hardware, firmware, or software.

One of the portable electronic appliances that can be configured to take advantage of the present invention will include a mobile telephone. A user may be able to scroll through various lists stored within the memory of the mobile telephone, depending on which list is activated. These lists might be for pictures stored within the mobile telephone, a directory of stored names, a directory of received calls, a directory of called numbers, an address book, a date book, etc.

Other appliances will include remote control devices, personal digital assistants (PDAs), personal game devices, and even laptop computers. Computers can use the present invention to assist in navigation through menus. Productivity may be increased when using, for example, CAD (computer aided design) software where many nonlinear controls are needed with instant access, saving keystrokes or menu selections.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for performing scrolling in any active list shown on a display by using a touchpad, said method comprising the steps of:
    1) providing a touchpad having a first scrolling activation zone that enables a scrolling function, and a non-activation region wherein touching down does not activate the scrolling function;
    2) touching down with a pointing object in the first scrolling activation zone;
    3) activating the scrolling function in an active list of items; and
    4) moving the pointing object in a circular motion anywhere in the first scrolling activation zone and the non-activation region to perform scrolling of the items in the active list.

2. The method as defined in claim 1 wherein the method further comprises the steps of:
    1) moving the pointing object in a first direction to perform scrolling in the active list in a first direction; and
    2) moving the pointing object in an opposite direction relative to the first direction to perform scrolling in the active list in the opposite direction.

3. The method as defined in claim 1 wherein the method further comprises the step of changing a direction of scrolling at any time within the active list when the scrolling function is active by simply moving the pointing object in a direction that is opposite to a present direction of scrolling.

4. The method as defined in claim 1 wherein the method further comprises the step of using a size of a radius of the circular motion to determine a rate at which scrolling will occur.

5. The method as defined in claim 1 wherein the method further comprises the step of providing a second scrolling activation zone on the touchpad, wherein the first scrolling activation zone only activates fast scrolling, and wherein the second scrolling activation zone only activates slow scrolling.

6. The method as defined in claim 1 wherein the step of activating the scrolling function further comprises the step of activating the scrolling function for a predetermined list, regardless of whichever list is the active list.

7. The method as defined in claim 6 wherein the method further comprises the step of making the predetermined list a selectable list that can be changed by a user to be any list that can be made the active list.

8. The method as defined in claim 1 wherein the method further comprises the step of disposing the touchpad over the display, wherein the touchpad is substantially transparent to a user.

9. The method as defined in claim 8 wherein the method further comprises the step of enabling the display to indicate at least one button that can be activated by touchdown on the touchpad.

10. The method as defined in claim 9 wherein the method further comprises the steps of:
    1) activating the at least one button by performing a touchdown within a boundary of the at least one button; and
    2) increasing or decreasing a value controlled by the button by moving the pointing object in the circular motion.

11. The method as defined in claim 10 wherein the method further comprises the step of replacing the at least one button with at least one different button in a same location, wherein the at least one different button is activated by touchdown within the boundary of the at least one button.

12. The method as defined in claim 1 wherein the method further comprises the step of increasing or decreasing a value of a parameter by moving the pointing object in the circular motion.

13. The method as defined in claim 12 wherein the method of increasing or decreasing a value of a parameter further comprises the step of selecting the parameter from the group of parameters comprised of adjustments to volume, adjusting settings on an equalizer, adjusting brightness, adjusting contrast, adjusting speed forward or backward, skipping forwards and backwards among various items, zooming in or out, moving a view or a web page up or down, moving a channel selection up or down, and advancing forwards or backwards through items that may be selected such as tools or weapons in a game.

14. The method as defined in claim 1 wherein the method further comprises the steps of:
    1) providing a touchpad;
    2) performing a multiple-tap operation with a pointing object;
    3) activating a scrolling function for a list of items shown on the display in response to the multiple-tap operation; and
    4) moving the pointing object in a circular motion anywhere on the touchpad to perform scrolling of the items in the list.

15. The method as defined in claim 1 wherein the method further comprises the steps of:
    1) providing a touchpad having a first parameter activation zone;
    2) touching down with a pointing object in the first parameter activation zone; and
    3) moving the pointing object in a circular motion anywhere on the touchpad to increase or decrease a value of the parameter.

16. A method for performing scrolling of items in a predetermined list using a touchpad, said method comprising the steps of:
    1) providing a touchpad having a first scrolling activation zone that enables a scrolling function, and a non-activation region wherein touching down does not activate the scrolling function;
    2) touching down with a pointing object in the first scrolling activation zone;
    3) activating the scrolling function in a predetermined list of items associated with the first scrolling activation zone; and
    4) moving the pointing object in a circular motion anywhere in the first scrolling activation zone and the non-activation region to perform scrolling of the items in the list.

17. The method as defined in claim 16 wherein the method further comprises the step of making the predetermined list a selectable list that can be changed by a user.

* * * * *